United States Patent
MacLeod (10) Patent No.: US 6,693,585 B1
(45) Date of Patent: Feb. 17, 2004

(54) SELF-CONTAINED SELECTIVELY ACTIVATED MOBILE OBJECT POSITION REPORTING DEVICE WITH REDUCED POWER CONSUMPTION AND MINIMIZED WIRELESS SERVICE FEES.

(75) Inventor: John B. MacLeod, Del Mar, CA (US)

(73) Assignee: Aradiant Corporation, San Diego, CA (US)

(*) Notice: Subject to any disclaimer, the term of this patent is extended or adjusted under 35 U.S.C. 154(b) by 36 days.

(21) Appl. No.: 10/071,020

(22) Filed: Feb. 7, 2002

(51) Int. Cl.[7] .............................. H04B 7/185; G01S 3/02
(52) U.S. Cl. .............................. 342/357.07; 342/357.1; 342/457
(58) Field of Search ..................... 342/357.07, 357.1, 342/457

(56) References Cited

U.S. PATENT DOCUMENTS

| | | | |
|---|---|---|---|
| 5,777,580 A | | 7/1998 | Janky et al. |
| 5,786,789 A | | 7/1998 | Janky |
| 5,883,594 A | | 3/1999 | Lau |
| 6,069,570 A | | 5/2000 | Herring |
| 6,133,871 A | | 10/2000 | Krasner |
| 6,172,640 B1 | * | 1/2001 | Durst et al. ............ 342/357.07 |
| 6,236,358 B1 | | 5/2001 | Durst et al. |
| 6,297,768 B1 | * | 10/2001 | Allen, Jr. ................. 342/357.1 |
| 6,339,745 B1 | * | 1/2002 | Novik .................... 342/357.07 |
| 6,363,323 B1 | * | 3/2002 | Jones ...................... 342/357.1 |

FOREIGN PATENT DOCUMENTS

WO    WO00/68907    11/2000

OTHER PUBLICATIONS

Phone Warehouse: Phone Facts: Pagers webpage, http://www.affordablephones.net/pagerfacts.htm, printed Apr. 25, 2003.*

Advertisement of Harris Corporation entitled "MICRO–TRAX Tracking and Location System", 2 pages, copyright 1998, 1999, 2000.

* cited by examiner

*Primary Examiner*—Thomas H. Tarcza
*Assistant Examiner*—F H Mull
(74) *Attorney, Agent, or Firm*—Glenn Patent Group; Michael A. Glenn

(57) ABSTRACT

A system for selectively reporting the position of a person, animal, vehicle, or other mobile object utilizes a low power remote tracking device with a one-way tone-only paging receiver, wireless telephone transceiver, and location-sensing device such as a GPS unit. The paging receiver responds to remotely initiated activation signals to selectively power-up the location-sensing device and transceiver. The location-sensing device determines position, whereupon the transceiver places a call to report the tracking device's position. Position reports may be transmitted upon request, or repeatedly upon a predetermined schedule. The mobile tracking device may deactivate automatically, or in response to a further deactivation

19 Claims, 7 Drawing Sheets

SELF-CONTAINED SELECTIVELY ACTIVATED MOBILE OBJECT POSITION REPORTING DEVICE WITH REDUCED POWER CONSUMPTION AND MINIMIZED WIRELESS SERVICE FEES.

BACKGROUND OF THE INVENTION

1. Field of the Invention

The present invention relates to a system for monitoring the position of a person, animal, vehicle, or other mobile object. More particularly, the invention utilizes a low power remote tracking device with a tone-only paging receiver, wireless transceiver, and global positioning system (GPS) unit, where the system responds to remotely initiated activation signals by powering-up and transmitting data stating the remote tracking device's position.

2. Description of the Related Art

Nearly one third of all pet dogs and pet cats become lost from their owners at some point in their lives. In spite of great effort expended in searching, posting rewards, distributing handbills, and the like, less than 20 percent of dogs are recovered, and less than 3 percent of cats. Searching for lost pets consumes pet owners' time, and in many cases, their emotions as well. And, when a pet is lost permanently, its owner incurs further costs in grief and, in some cases, new pet acquisition.

Obviously, pets are unable to reliably operate traditional remote communication devices such as cell phones, pagers, and the like. Initially, there would seem to be some promise for self-operated locating devices such as homing beacons and transmitters that communicate with a base station or other central facility. Unfortunately, most homing beacons and transmitters consume excessive battery power. And, although some selectively activated locating devices exist, they still consume significant electrical power. Therefore, they are limited in their operational time. When a battery dies in such an application, the remote transmitter ceases to function. This likely results in loss of the pet, which is the precise occurrence of which these systems seek to avoid. Therefore, the pet owner must frequently attend to the inconvenient and expensive task of battery replacement.

In addition to power consumption, another issue with known tracking systems is the cost of conducting communications between remote tracking devices and a base station. A number of approaches, for example, use wireless telecommunications services such as cellular telephones or two-way pagers. With these approaches, costs are incurred to subscribe to such communications services, and additional costs are typically incurred to utilize such services. Reduction of such costs poses a continual challenge to designing a practical pet tracking system.

Known products, then, are not always completely adequate for use in tracking pets and other mobile items due to these and other certain unsolved problems.

SUMMARY OF THE INVENTION

Broadly, the present invention concerns a system for monitoring the position of a person, animal, vehicle, or other mobile object. The invention utilizes a low power remote tracking device (also called a "mobile object position reporting device") with a one-way paging receiver, cellular or other wireless transceiver, and location-sensing device exemplified by a GPS unit. When the paging receiver receives a remotely initiated activation signal, power is selectively applied to the GPS unit and wireless transceiver. After the GPS unit determines the tracking device's position, the wireless transceiver contacts a designated reporting site with data stating the remote tracking device's position. If desired, additional position reports may be repeatedly transmitted, either on a predetermined schedule or as remotely requested.

The invention is especially beneficial for tracking pets collared with such tracking devices, in which case a central tracking coordination facility broadcasts the necessary activation signal via a selected one-way paging network whenever a customer loses his/her pet. Nonetheless, the invention may also be applied to the task of monitoring the position of children, prisoners, hospital patients, people with reduced mental facility, vehicles, or other mobile objects.

The invention affords its users with a number of distinct advantages. Unlike other projects in this area, the unique application of a receive-only paging unit (low power consumption) to selectively activate the wireless transceiver (high power consumption) and GPS unit when a tracking request arrives enables the tracking devices to run on battery power for many months. Use of a tone-only pager reduces the tracking device's equipment costs and wireless service costs without affecting its utility. Also, where the wireless transmitter is implemented by a cellular or PCS telephone unit, subscriber service costs for the cellular transceiver are minimized by using a nonconforming, transmit-only mobile identification number (MIN). This minimizes the costs of operating this tracking system. And, because nonconfirming MINs are not controlled, new telephone numbers may be easily obtained for tracking devices as they are purchased by customers and eventually activated. Although the cellular operator may charge higher per-minute rates for these outgoing calls (compared to standard cellular calls), these monthly service costs are significantly reduced. Namely, such calls are only required if the mobile object is lost, which occurs rarely. Thus, wireless telephone costs for the tracking system of this invention are low. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Overall Pet Tracking System

Figure 1:
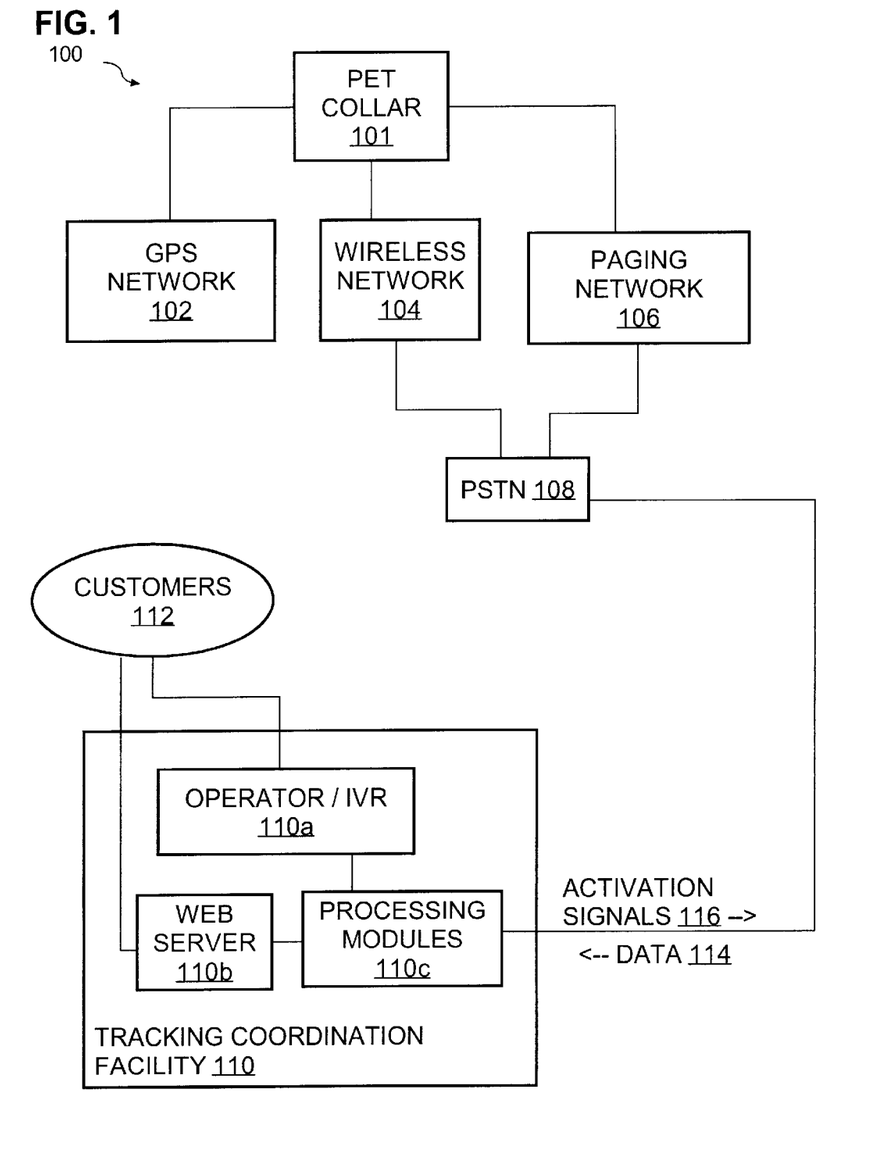
FIG. 1 is an overall block diagram of the hardware components and interconnections of one embodiment of pet tracking system.

FIG. 1 shows a general view of an entire pet tracking system 100, constituting one aspect of the present invention. The system 100 includes a pet collar 101 in communication with a GPS satellite network 102, wireless network 104, and paging network 106. The pet collar 101 is fastened to a dog, cat, or other pet. Although the present discussion concerns pets, pet collars, and pet tracking, this is merely for ease of illustration—the concepts of this invention may be applied to tracking people, vehicles, and many other mobile objects. The pet collar 101 includes the remote tracking device of the invention, described in greater detail below.

The components 104, 106 are operatively coupled to a tracking coordination facility 110 over various communications facilities including the public switched telephone network (PSTN) 108. The tracking coordination facility 110 includes a web server 110b, operator/interactive voice response system (IVR) 110a, and various processing modules 110c. Customers 112, such as pet owners, may submit their pet tracking requests to the facility 110 in numerous ways, including (1) using the Internet, in which case the customer uses the web server 110b, (2) speaking over the telephone, in which case the customer 112 places a telephone call to an operator 110a at the facility 110, (3) operating a telephone keypad or uttering machine-readable voice commands, in which case the customer 112 utilizes the facility's integrated voice response (IVR) system 110a, or (4) utilizing various other means such as e-mail, facsimile, postal delivery, whether submitted to an operator 110a or automated recipient 110c. The processing modules 110c coordinate receipt of customers' pet tracking requests, activation of the appropriate pet collar 101 (by sending activation signals 116), collection of location data 114 from the pet collar 101 in the field, and reporting of the pet's location back to the customer 112. Commands to activate the pet collar 101 are shown by 116. Location data returned by the pet collar 101 is shown by 114.

Pet Collar

Figure 2:
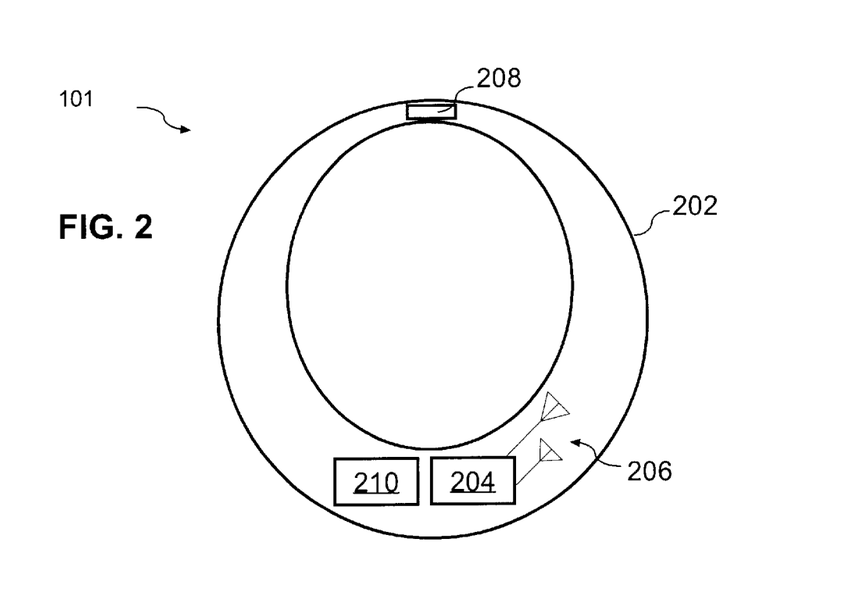
FIG. 2 is a block diagram of the hardware components and interconnections of a remote tracking device.

FIG. 2 depicts the pet collar 101 in greater detail. The collar 101 includes a collar body 202 that provides housing, mounting, attachment, enclosure, or other support for a remote tracking device 204. Some examples of the body 202 include a plastic case, fabric enclosure, composite shell, fiberglass housing, or other collar of suitable material and structure. The remote tracking device 204 includes various antennas 206 such as paging and wireless antennas. The paging and wireless antennas 206 may be physically separated by an appropriate distance as needed to avoid signal interference. A GPS antenna 208 is provided near the top of the pet collar 208 to maximize satellite coverage, and weights 210 ensure that the antenna 208 faces upward.

Remote Tracking Device

Figure 3:
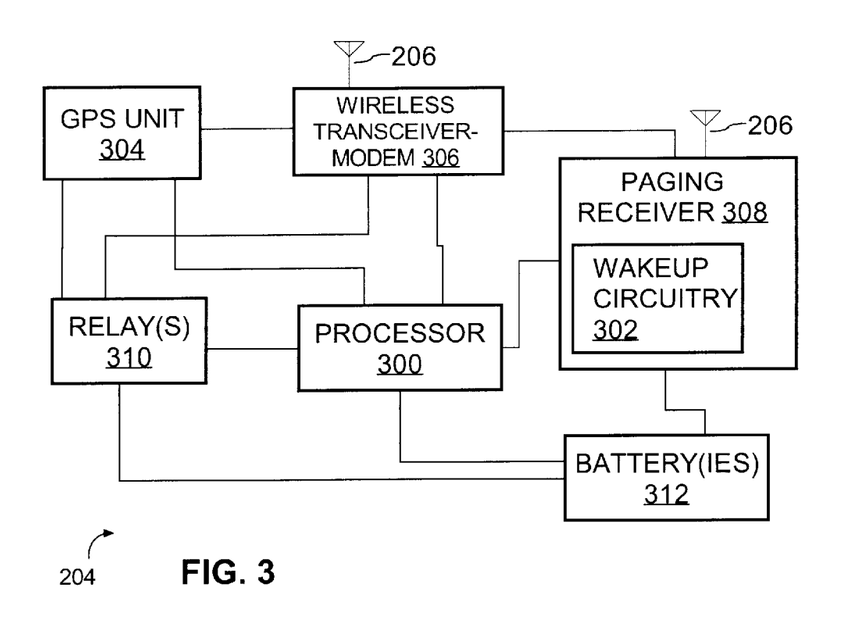
FIG. 3 is a schematic diagram specifically showing the circuit components of the remote tracking device of FIG. 2.

FIG. 3 depicts the remote tracking device 204 in greater detail. To communicate and determine position, the device 204 has components including a GPS unit 304, wireless transceiver and modem 306 ("transceiver-modem"), and paging receiver 308. To regulate, manage, and support operations of these components 304, 306, 308, the device 204 includes relays 310, a processor 300, wakeup circuitry 302, and batteries 312.

The GPS unit 304 comprises circuitry for determining the device's latitude/longitude or other position on Earth. In one example, the unit 304 comprises a GPS engine to obtain raw satellite data, and also a GPS processor to determine position from the raw GPS data. Although GPS is used as one example, the GPS unit 304 may employ a different self-locating apparatus, such as one that uses long range navigation (LORAN), inertial navigation, radio beacons, or other principles. Still another alternative to the GPS unit 304 is a network-based location system as commercially offered by Qualcomm's Snaptrack Corp. and other companies.

The transceiver-modem 306 comprises circuitry for transmitting analog and/or digital data to the tracking coordination facility 110 (FIG. 1). Optionally, the transceiver-modem 306 may lack the capability to receive voice and non-network information. For example, the unit 306 may comprise a transmitter utilizing microburst technology. Alternatively, the transceiver-modem 306 may comprise a transmit-only unit except for some nominal ability to receive network communications, for example, handshaking, timing, and other signals that are not relayed to the caller/subscriber. In still another alternative, the unit 306 may comprise a transmit/receive unit with receive functionality (albeit unused, in the present application) as implemented by certain economical off-the-shelf transceiver units. Thus, the transceiver-modem 306 may comprise a transmit-only unit or a transmit-receive unit (i.e., transceiver), depending upon the application. For purposes of illustration, the unit 306 discussed herein is a transceiver. To minimize operating costs and component costs, the transceiver-modem 306 may comprise a cellular or PCS telephone transceiver, many of which are known in the art. Alternatively, the transceiver-modem 306 may comprise a two-way data communications paging transceiver or a one-way transmitter such as a microburst transmitter.

The paging receiver 308 comprises receive-only circuitry to process activation signals from the tracking coordination facility 110. Although the receiver 308 may comprise two-way paging circuitry, using receive-only circuitry conserves equipment costs and substantially reduces power consumption, and may also reduce service costs. To further reduce hardware costs and airtime charges, the paging receiver 308 may comprise a tone-only pager unit. Still, a numeric or alphanumeric unit may be used if desired.

The processor 300 activates and coordinates operations of the components 304, 306. This is discussed in greater detail below. The processor 300 may comprise one or more microprocessors, application specific integrated circuits (ASICs), discrete circuit elements, logic circuits, or any other digital data processing circuitry. The relays 310 comprise transistors, switches, relays, or other electrical and/or mechanical switching devices operable under control of the processor 300 to selectively activate and deactivate the GPS unit 304 (such as by applying and removing power, as illustrated) and transceiver-modem 306. Wakeup circuitry 302 periodically applies power to the paging receiver 308, and in turn, the receiver 308 selectively applies power to the processor 300 if the paging receiver 308 has received an activation signal during its "awake" time. By using the paging receiver 308 to check for an activation signal with a suitably frequent cycle, this avoids running the receiver 308 to continually draw precious battery power. The wakeup circuitry 302 may utilize an oscillator, timer, clock, ASIC, or other suitable trigger circuit.

Tracking Coordination Facility

Figure 4:
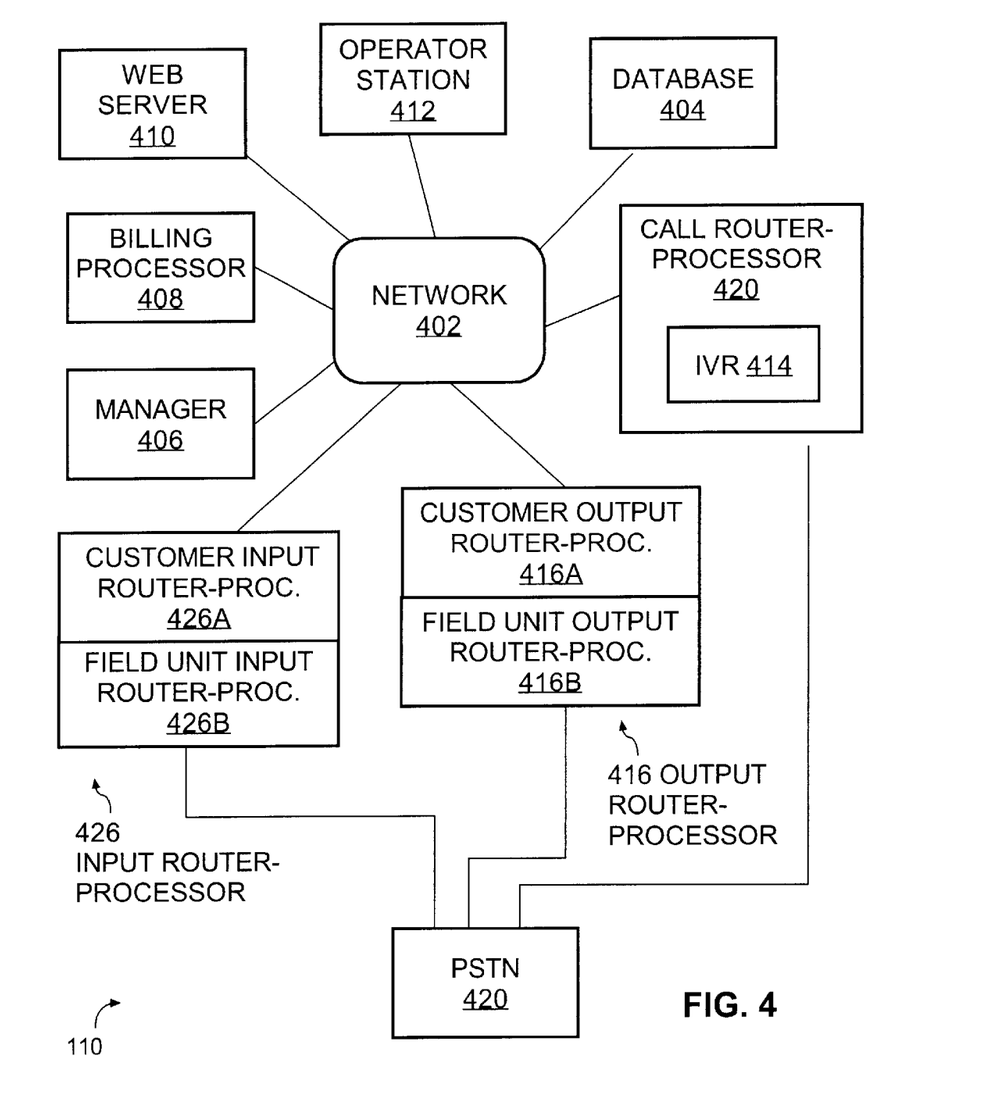
FIG. 4 is a block diagram specifically showing the components of the tracking coordination facility of FIG. 2.

FIG. 4 provides a more detailed depiction of one embodiment of the tracking coordination facility 110. Many other implementations may be used without departing from the scope of this invention. Broadly, the facility 110 functions to coordinate receipt of customers' pet tracking requests, activation of the appropriate pet collar, collection of location data from the pet collar in the field, and reporting of the pet's location back to the customer. The facility 110 includes a network 402 to coordinate operations of its various peripheral components. The network 402 may comprise a local area network, wide area network, distributed computing network, electrical busses, mainframe computer or computer workstation, storage area network, network hub, or other communications link.

Coupled to the network 402, the facility 110 includes a database 404 that contains information identifying each pet and/or pet owner registered with the facility 110, and the information needed to activate the location self-reporting features of each pet's collar. TABLE 1 (below) provides a simplified example of the database 404, where pets are identified solely by their names, and the remote tracking devices' activation information is given by pager numbers.

TABLE 1

| Pet Name | Pager Number |
| --- | --- |
| Rover | (555) 222-2222 |
| Boots | (555) 333-3333 |
| Spot | (555) 444-4444 |
| Fido | (555) 555-5555 |

Anticipating a larger number of pets with some duplicate names, the database 404 may use other information to identify each pet, such as its owner's social security number, the owner's telephone number, the owner's name, a unique code associated with each different remote tracking device upon manufacture, a unique personal identification number (PIN) or other registration code provided when the owner registers his/her mobile tracking device with the facility 110, etc. Depending upon the nature of the specific application, the database 404 may also contain a variety of other data, such as each customer's language preference, the paging and wireless carriers used for each pet collar, the coverage of each paging and wireless contract (e.g., local, regional, nationwide), paging and wireless contracts' subscription length, high resolution street-level maps, rates and other billing information, etc.

In an alternative embodiment to that described in TABLE 1, the facility 110 may address activation signals to the remote tracking units directly, rather than the paging network performing a translation to the RF radio frequency address of the paging receiver 308. In this embodiment, the database 404 may replace the pager numbers with different information for directly activating the paging receivers, such as the tracking devices' paging IDs, paging receiver capcodes, network IDs, data communications routing information, and all other information needed to correctly route and address activation signals to paging receivers in the field.

The facility 110 also includes various other components, each coupled to the network 402. A manager 406 acts to supervise and coordinate the overall operation of the facility 110. A billing processor 408 supervises financial activities such as billing of customers for pet tracking services, storage of billing records in the database 404 or elsewhere, etc. A web server 410 is (optionally) provided as a means to interact with customers, namely receiving registration requests from customers that have purchased remote tracking devices, receiving pet tracking requests from registered customers, obtaining payment for pet tracking services on a one-time or subscription basis, and presenting location data for pets that have been found. The components 410, 408, 406 may be implemented by one or more computing machines, application programs, or other hardware and/or software construct(s). The operator station 412 comprises an interface usable by a human operator to interact with other components of the facility 110. For instance, the station 412 may include one or more of the following: video monitor, analog display, keyboard, mouse, pushbuttons, dials, switches, computer terminal, computer, etc.

An output processor 416 comprises one or more computing machines, such as a server, computer workstation, personal computer, computing network, one or more application programs, or other appropriate facility. The output processor 416 includes a customer output router-processor 416a and a field unit output router-processor 416b. The customer output router-processor 416a formats and outputs data from the manager 406 to customers via an appropriate device such as the operator station 412, IVR 414, or web server 410. The field unit output router-processor 416b formats and outputs data from the manager 406 to remote tracking devices 204; one example includes activation signals, which are sent whenever pets are lost. Output data from the unit 416a is sent to devices 204 via the PSTN 420 or another broadband pipe or other communications link (not shown). Each of the foregoing units 416a, 416b includes a modem or other apparatus to translate outbound signals to the PSTN 420. For example, the modem 418 may comprise an FCC certified modem compatible with the PSTN.

Complementary to the output processor 416, the input processor 426 comprises one or more computing machines such as server, computer workstation, personal computer, computing network, one or more application programs, or other appropriate facility. The input processor 416 includes a customer input router-processor 416a and a field unit input router-processor 416b. The customer input router-processor 416a receives and formats machine-readable data coming from customers via the web server 410, e-mail, facsimile, telnet or other terminal mode, operator station 412, or other source, and forwards such information to the manager 406. The field unit input router-processor 416b receives and formats machine-readable data coming from remote tracking devices 204 via the router/processor 422, and forwards such information to the manager 406. Each of the foregoing units 426a, 426b includes a modem or other apparatus to translate inbound signals from the PSTN 420. An example of the modem 418 is an FCC certified modem compatible with the PSTN.

The call router-processor 422 comprises equipment to route incoming telephone calls from the PSTN 420 to appropriate components of the facility 110 such as the input processor 426 or operator station 412. As one example, the call router-processor 422 may comprise a controller, router, and voice switch implemented by one or more computing machines such as a server, computer workstation, personal computer, computing network, one or more application programs, or other appropriate facility. Optionally, the voice switch component of the call router-processor 420 may include an interactive voice response (IVR) component 414, such as an audible, interactive, telephone-based voice-menu (or DTMF-menu) hardware and/or software system to provide a voice-menu or DTMF-menu to aid in receiving and routing customers' pet locating requests throughout the facility 110. The IVR 414 may comprise, for example, a software application running on the call router-processor 420.

Exemplary Digital Data Processing Apparatus

As mentioned above, the invention includes many different digital data processing components, such as the processor 300, manager 406, processors 420, 426, 416, and the like. Each of these (and any other) digital data processing components may be implemented in various forms. Moreover, in the interest of cost effectiveness, the task of multiple such components may be consolidated by one device where practicable.

Figure 5:
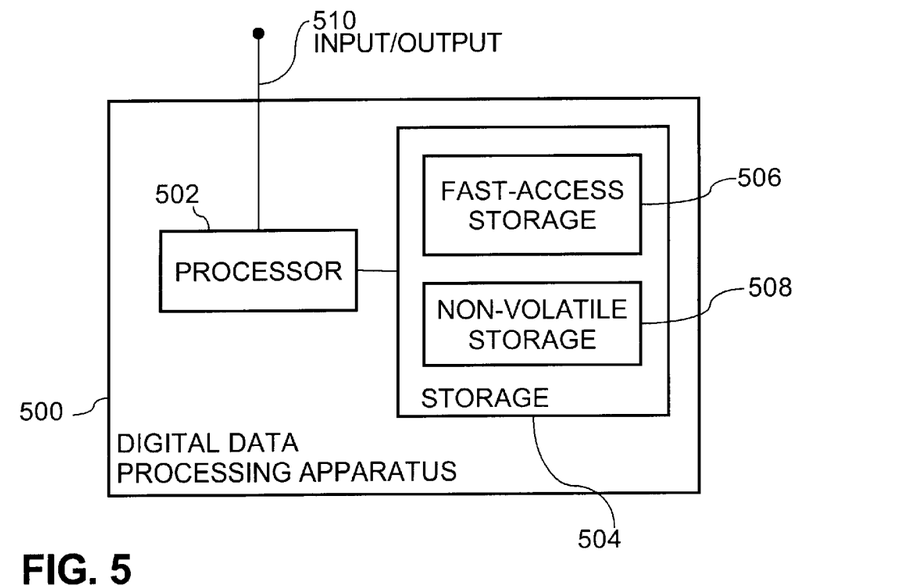
FIG. 5 is a block diagram of a digital data processing machine.

FIG. 5 shows the hardware components and interconnections of an exemplary digital data processing apparatus 500. This apparatus 500 includes a processor 502, such as a microprocessor, personal computer, workstation, or other processing machine, coupled to a storage 504. In the present example, the storage 504 includes a fast-access storage 506, as well as nonvolatile storage 508. The fast-access storage 506 may comprise random access memory ("RAM"), and may be used to store the programming instructions executed by the processor 502. The nonvolatile storage 508 may comprise, for example, battery backup RAM, EEPROM, one or more magnetic data storage disks such as a "hard drive," a tape drive, or any other suitable storage device. The apparatus 500 also includes an input/output 510, such as a line, bus, cable, electromagnetic link, or other means for the processor 502 to exchange data with other hardware external to the apparatus 500.

Despite the specific foregoing description, ordinarily skilled artisans (having the benefit of this disclosure) will recognize that the apparatus discussed above may be implemented in a machine of different construction, without departing from the scope of the invention. As a specific example, one of the components 506, 508 may be eliminated; furthermore, the storage 504, 506, and/or 508 may be provided on-board the processor 502, or even provided externally to the apparatus 500.

Logic Circuitry

In contrast to the digital data processing apparatus discussed above, a different embodiment of the invention uses logic circuitry instead of computer-executed instructions to implement some or all of the digital data processing components of the invention. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the operational aspect of the present invention will now be described. Although the present invention has broad applicability to tracking of pets, vehicles, people, or any mobile thing, the specifics of the structure that has been described is well suited for pet tracking, and the explanation that follows will emphasize such an application of the invention without any intended limitation.

Signal-Bearing Media

Figure 6:
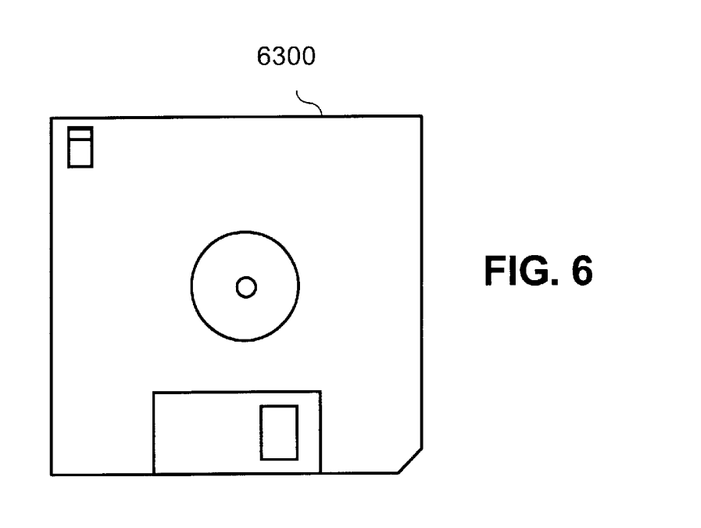
FIG. 6 shows an exemplary signal-bearing medium.

Wherever the functionality of the invention is implemented using machine-executed program sequences, these sequences may be embodied in various forms of signal-bearing media. In the context of FIG. 5, this signal-bearing media may comprise, for example, the storage 504 or another signal-bearing media, such as a magnetic data storage diskette 600 (FIG. 6), directly or indirectly accessible by a processor 502. Whether contained in the storage 506, diskette 600, or elsewhere, the instructions may be stored on a variety of machine-readable data storage media. Some examples include direct access storage (e.g., a conventional "hard drive," redundant array of inexpensive disks ("RAID"), or another direct access storage device ("DASD")), serial-access storage such as magnetic or optical tape, electronic non-volatile memory (e.g., ROM, EPROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, JAVA, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Remote Tracking Device

Figure 7:
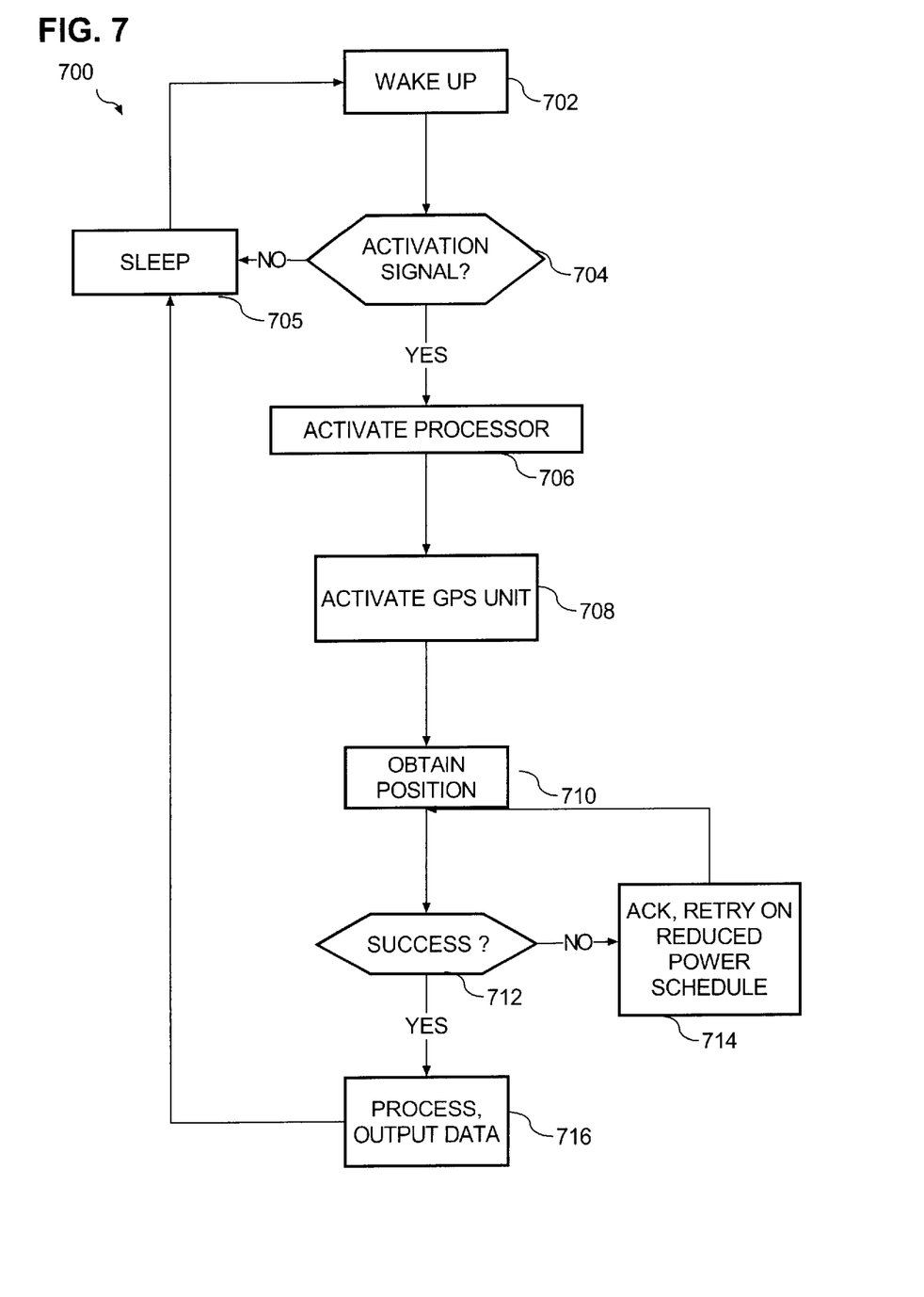
FIG. 7 is a flowchart of a sequence for operating the remote tracking device.

FIG. 7 depicts an exemplary sequence 700 for operating a remote tracking device deployed on a pet or other mobile object. For ease of explanation, but without any intended limitation, the example of FIG. 7 is described in the context of pet tracking, and in the environment of the remote tracking device 204 (FIG. 3) described above. The operations 700 are therefore performed by the components of the device 204. The sequence 700 is initiated in step 702, when the wakeup circuitry 302 activates the paging receiver 308. This may be achieved, for example, by providing a predetermined signal to an particular electrical pin (such as ENABLE) on the receiver 308, issuing a hardware interrupt, activating a relay or other circuit causing battery power to be applied to the receiver 308, or any other suitable technique for enabling the functions of the receiver 308. As one example, step 702 may be performed on a periodic basis, such as every few milliseconds, seconds, or another rate sufficient to avoid possibly missing activation signals.

In step 704, the wakeup circuitry 302 determines whether the paging receiver 308 is receiving a prescribed activation signal. In the illustrated example, where the paging receiver 308 comprises a tone-only paging receiver, the wakeup circuitry 302 concludes that the paging receiver 308 has received the prescribed activation signal whenever the paging receiver 308 issues a tone output on an appropriate pin, wire, or other node. In the absence of any activation signal, the wakeup circuitry 302 puts the receiver 308 back to sleep in step 705.

On the other hand, when the paging receiver 308 receives the proper activation signal (e.g., a paging signal with a specific capcode) and the paging receiver 308 responsively issues its tone output, this means that the tracking coordination facility 110 (FIG. 1) is attempting to locate the remote tracking device 204, presumably because the pet assigned to this device 204 is lost. In this event, the paging receiver 308 activates the processor 300 in step 706. This may be achieved, for example, by providing a predetermined signal to an particular electrical pin (such as ENABLE) on the processor 300, issuing a hardware interrupt, causing battery power to be applied to the processor 300, or any other suitable technique for enabling the functions of the processor 300. Following step 706, the processor 300 in turn activates the GPS unit 304 (e.g., by use of the relay 310), whereupon the GPS unit 304 determines its geographic position (step 710).

In step 712, the processor 300 determines whether the GPS unit 304 has succeeded in determining position. If not, the processor 300 directs the transceiver-modem 306 to transmit an acknowledge (ACK) signal to the facility 110 (step 714). The ACK signal advises the facility 110 that the unit 204 is operational, and that is has received the activation signal. This keeps the facility 110 from wondering whether the unit 204 ever received the activation signal. An example of this may occur, for example, where the collared pet is located in a parking garage, under a porch, or in another site that prevents acquisition of GPS satellite signals but permits passage of radio frequency activation signals. Also in step 714, the processor 300 directs the GPS unit 304 to continue attempts to determine its position, albeit on a schedule of reduced frequency or other factors to conserve power. Step 714 returns to step 712 on occasion to determine whether the GPS unit 304 has succeeded in locating its position.

When the processor 300 finds that the GPS unit 304 has succeeded in determining position (step 712), the processor 300 coordinates the outputting of this data (step 716). Optionally, the processor 300 may place raw data from the GPS unit 304 into latitude/longitude format, azimuth/distance format, township/range format, or another suitable format. In outputting this data, the processor 300 activates the wireless transceiver-modem 306 (e.g., by using the relay 310), and directs the transceiver-modem 306 to transmit the GPS location data to a predetermined destination. In the present example, where the transceiver-modem 306 comprises a cellular telephone transceiver, the processor 300 directs the transceiver-modem 306 to place a data call to the tracking coordination facility 110 (FIG. 1).

Step 716 may be carried out in different ways. In one embodiment, the device 204 may continue to resend the location data at predefined intervals until such time as the device 204 has insufficient battery power to operate the transceiver-modem 306. In another embodiment, the processor 300 causes the transceiver-modem 306 to send the location data, shut down for a predetermined time, power up again, and repeat this cycle until battery power is exhausted. This approach allows the transceiver-modem 306 to repeatedly send its location over a larger time period than if the transceiver were to transmit continuously. As another approach, step 716 may continue until the device 204 receives a deactivation signal. In another approach, the device 204 will not attempt to send the location again until it receives another activation signal. After step 716, components of the device 204 return to sleep in step 705.

Recovering Lost Pets

Figure 8:
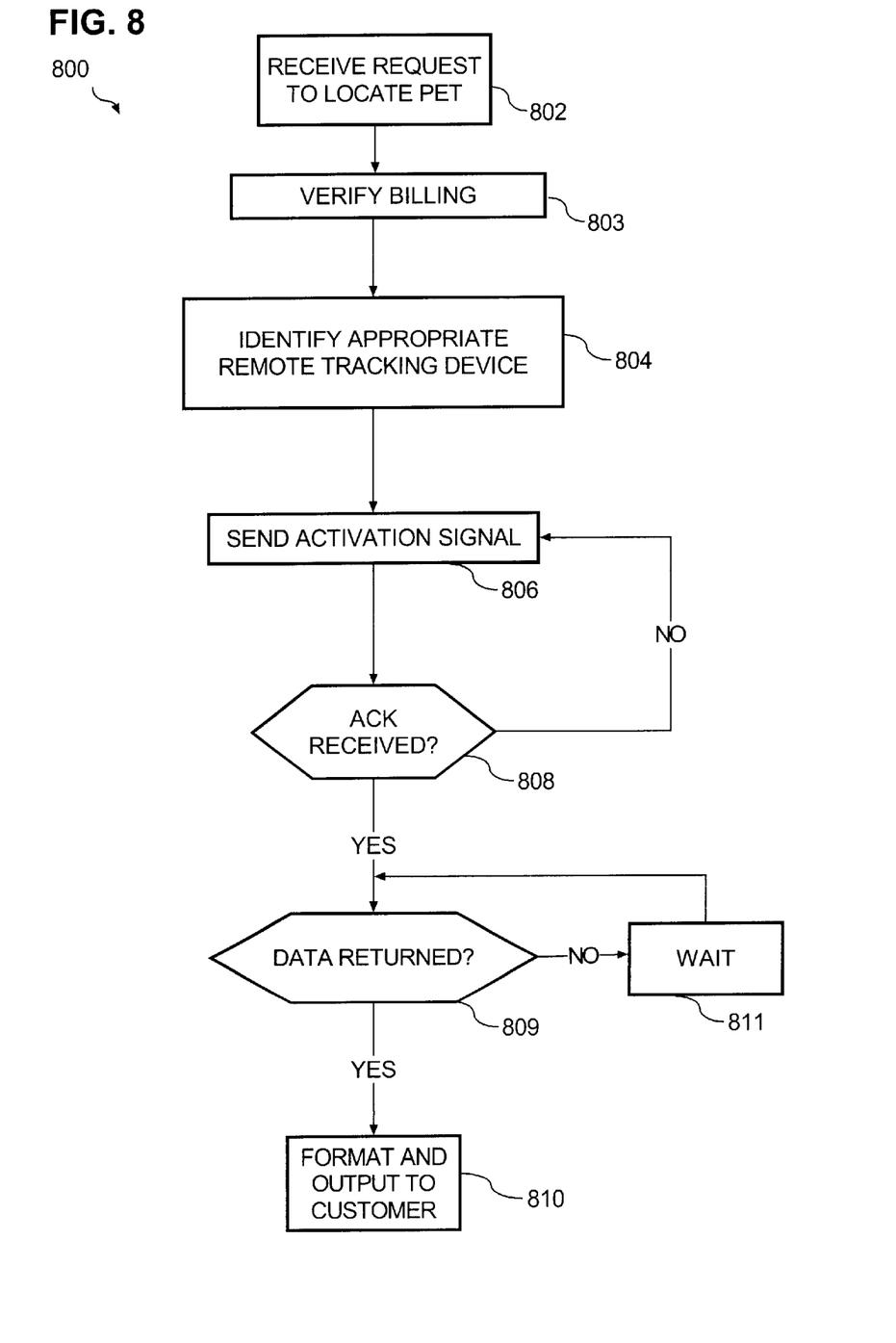
FIG. 8 is a flowchart showing the operation of a tracking coordination facility, in which this facility receives a pet locating request, obtains the pet's location, and provides a representative output of the pet's location.

FIG. 8 depicts an exemplary sequence 800 for operating the tracking coordination facility 110. Namely, in this sequence the tracking coordination facility 110 receives a pet locate request, activates the appropriate remote tracking device to learn the pet's location, and provides a representative output of the pet's location to the customer. For ease of explanation, but without any intended limitation, the example of FIG. 8 is described in the context of the system 110 of FIG. 4 as described above.

The sequence 800 is initiated in step 802, with arrival of a customer's request to locate his/her lost pet; this request is referred to as a "pet locate request." The customer's pet locate request may be submitted and received in various ways. For instance, customers with Internet connectivity may log onto the Internet worldwide web site provided by the tracking coordination facility's web server 410. In this case, the customer identifies the lost pet by entering appropriate information (as prompted) such as a security password, information to identify the pet or owner registered with the facility 110, and any other data according to TABLE 1 or the other examples discussed above. As another example, the customer may manually contact a live operator 412 at the facility 110, for example by mail, toll-free telephone call, facsimile, e-mail, or other means. The operator accepts the lost pet information and selects the appropriate pet by using the operator station 412. In still another example, the customer places a telephone call directly to the tracking coordination facility 110 via the PSTN 420, and submits the lost pet information (as prompted) using the facility's interactive IVR system 414. The customer may additionally make automated (non-human) contact with the facility 110 by sending e-mail, facsimile, or other machine-readable message to the facility 110 for receipt by the customer input router-processor 426a or call router-processor 420.

Regardless of the means of receipt, step 802 also includes the step of forwarding the customer's pet information to the manager 406 for processing (step 802). After step 802, the manager 406 cooperates with the billing processor 408 to verify billing status for the requesting customer (step 803). Namely, the billing processor 408 consults billing records to verify that the requesting customer's subscription to the pet locating service is up to date. Also in step 803, the billing processor 408 substantiates the customer's identity, such as by examining a password, PIN, or other security information from the customer. Next, the tracking coordination facility identifies the appropriate remote tracking device associated with the lost pet (step 804). In the illustrated example, the manager 406 performs this operation by cross-referencing the customer's pet data in the database 404. With the appropriate remote tracking device identified, the manager 406 directs the field unit output router-processor 416b to issue an activation signal to the proper remote tracking device (step 806). In response, the unit 416b places a telephone call to the pager number associated with the identified remote tracking device, causing the paging network 106 (FIG. 1) to issue an activation signal to the identified remote tracking device 204. Alternatively, the unit 416b may include or interface with a paging terminal that translates the pager number associated with the identified remote tracking device into an RF address compatible with the paging receiver 308. In still another embodiment, where the information of TABLE 1 includes RF addresses rather than paging numbers or other codes, the unit 416b may issue or communicate with a suitable transceiver to issue an RF paging signal directed at this RF address of the desired paging receiver 308.

In an alternative embodiment to that described in TABLE 1, the facility 110 may address activation signals to the remote tracking units directly, rather than the paging network performing a translation to the RF radio frequency address of the paging receiver 308. In this embodiment, the database 404 may replace the pager numbers with different information for directly activating the paging receivers, such as the tracking devices' paging IDs, paging receiver capcodes, network IDs, data communications routing information, and all other information needed to correctly route and address activation signals to paging receivers in the field.

In step 808, the manager 406 determines whether the remote tracking device has acknowledged the activation signal of step 806, namely, whether the field unit input router-processor 426b has received an ACK signal from the remote device 204. If not, the manager 406 sees that the activation signal is re-sent (step 806). Otherwise, if the activation signal has been acknowledged, the manager 406 determines whether it has received a report of location data from the remote tracking device (step 809). Such data, if received, would arrive at the field unit input router-processor 426b via the PSTN 420. This is because the remote tracking device's wireless transceiver-modem is preprogrammed to call a predetermined telephone number assigned or otherwise routed to the field unit input router-processor 426. If the location data has not been received, the manger 406 waits (step 811) in order to give the remote tracking device additional time to respond.

When the manager 406 confirms receipt of the location data (step 809), the manager 406 formats and presents this data to the requesting customer (step 810). This may be accomplished in various ways. If the customer entered the pet locate request via the web server 410, the manager 406 may assist the web server 410 in presenting the location data as output on a web page. With the benefit of visual presentation afforded by web-based location reporting, one embodiment of the invention combines (overlays) the pet's reported location with detailed street level mapping from the database 404 or other source to display the pet's location as precisely as possible. In one example, the output may contain the located pet's distance and azimuth from the pet's home as previously identified by the customer. In a different example, the manager 406 may direct the operator station 412 to display the location data in text and/or graphics form for use by a live operator in verbally relaying the pet's location to the requesting customer. In still another example, the manager 406 may format and relay the location data to the IVR system 414 for audible presentation to the customer. In still another example, the customer data router-processor 416a may send a wireless data or voice message (e.g., to a telephone or pager), place an automated or live telephone call to a telephone or voice mail, or other output informing the subscriber that the pet has been located, where the pet is located, and how to obtain additional information.

Deactivation Sequence

In one embodiment, a sequence analogous to the foregoing sequence 800 may be performed to implement a deactivate feature. First, the tracking coordination facility 110 receives a deactivation request, which may be self-generated as deemed proper by the tracking coordination facility, or arise from an external source such as a customer that has located his/her pet (as in step 802), etc. Responsive to the request, the tracking coordination facility 110 identifies the appropriate remote tracking device 204 (as in step 804). Then, the tracking coordination facility 110 issues a deactivation signal to the remote tracking device (analogous to step 806). In one embodiment, the paging receiver 308 provides one tone output if an activation signal is received, and a different tone if a deactivate signal is received; the processor interprets the meaning of the paging tones, and takes appropriate action. Alternatively, the device 204 may utilize two paging receivers (not shown), one for activations and one for deactivations.

In response to the paging deactivation signal, the remote tracking device 204 removes electrical powerfrom some or all of the on-board circuitry (except for the wakeup circuitry 302). For example, the processor 300 may power-down the GPS unit 304 and the transmitter 306, and the paging receiver 312 may power-down the processor 300. Optionally, before being powered-down, the processor 300 may direct the transceiver-modem 306 to transmit an ACK message.

Configuring and Using the Tracking Coordination Facility

Figure 9:
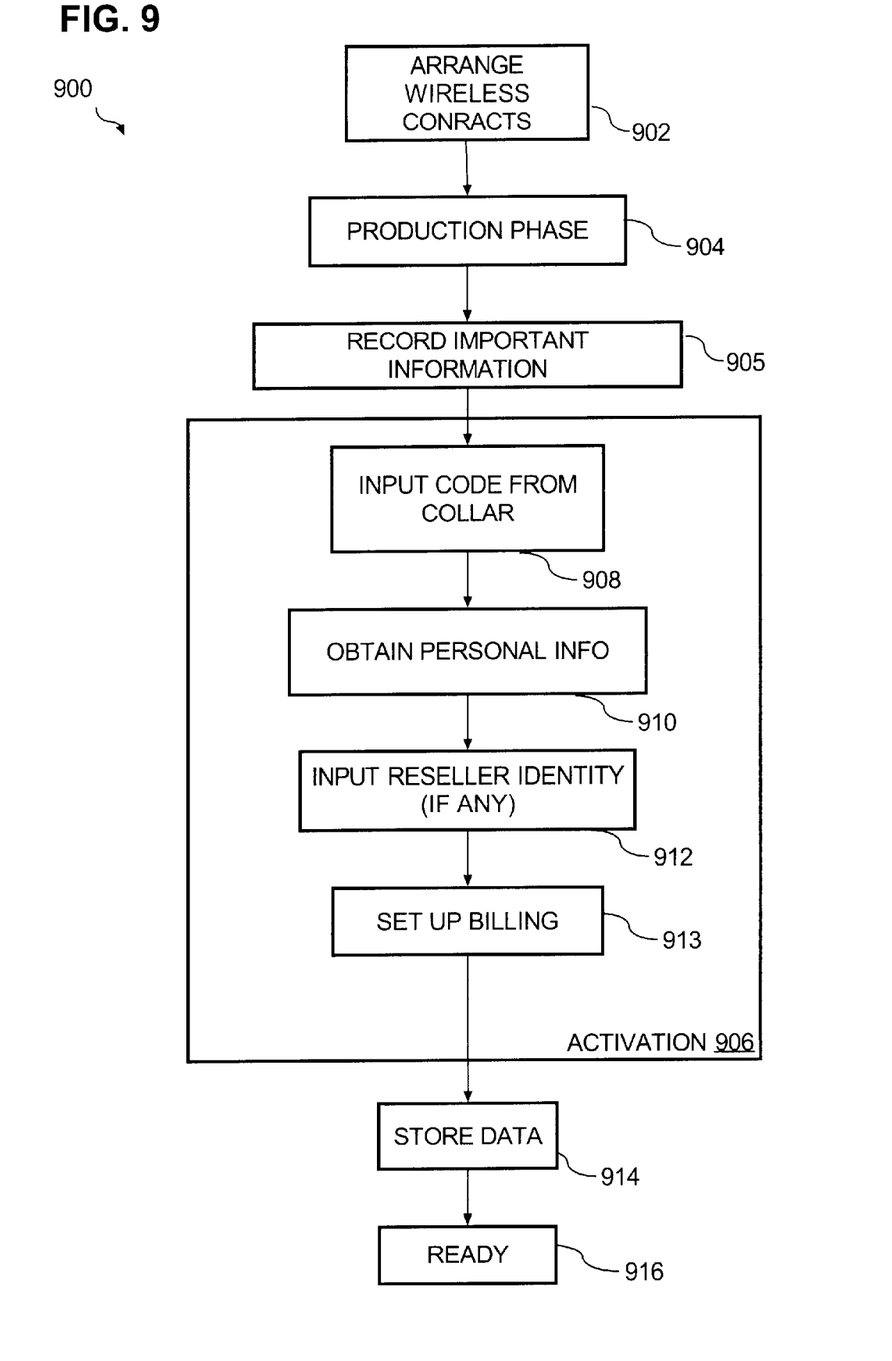
FIG. 9 is a flowchart showing a sequence for preparing the pet tracking system for operation.

FIG. 9 depicts an exemplary sequence 900 to prepare the overall pet tracking system for operation. For ease of explanation, but without any intended limitation, the example of FIG. 9 is described in the context of the tracking coordination facility 110 described above. The sequence 900 is initiated in step 902, where personnel of the tracking coordination facility arrange for wireless and paging service contracts for existing and/or future remote tracking devices. As for wireless service, in the embodiment where the wireless transceiver-modem 306 comprises a cellular or PCS telephone unit, contracts are structured to provide service as follows. Each wireless transceiver-modem is registered with the wireless carrier under a "non-conforming" MIN. For example, a non-conforming MIN may be one that does not fall under the North American numbering plan. A non-conforming MIN may be obtained, for example, by using a made-up area code. With a non-conforming MIN, the wireless transceiver-modem 306 has no "conforming" telephone number assigned by the wireless carrier, and the carrier's telephone switches do not contain an ID for this phone. In this way, the cellular service provider need not configure its switches to route incoming telephone calls to the wireless transceiver, and there will be little or no monthly cost for such service. Calls dialed to this non-conforming telephone number will not go through, yet the wireless network databases are configured to allow non-conforming MIN equipped transceivers 306 to place outbound calls. Thus, the transceiver-modem 306 is limited to transmit-only operation in the wireless network, i.e., originating but not receiving telephone calls.

In order to provide the wireless transceiver-modem with transmit capability, the MIN is registered with each contracted wireless service provider. Although this will require a contract where the wireless transceiver may incur a higher per-minute cost for its outgoing calls, the overall cost of operating each remote tracking device is low, as the more expensive outbound calls are only required if the pet is lost, which may occur rarely, if ever. As for paging service, step 902 involves contracting for tone-only, one-way paging service. Each remote tracking device ultimately receives its own unique activation signal, such as a unique capcode or other feature.

After step 902, the production phase 904 occurs. Namely, remote tracking devices are manufactured and sold. In one example, each remote tracking device is sold with a unique registration code, embossed on the circuit board itself, provided in product packaging or literature, etc. This code uniquely identifies its particular tracking device. After step 904, essential information about the particular tracking device is recorded prior to sale. At a minimum, a record is made of the device's registration code. After step 905, activation begins in step 906. Namely, the customer communicates with the manager 406 and/or billing processor 408 via the customer input router-processor 426a and one of the previously discussed communication portals, e.g., web server 410, human operator 412 (via PSTN 420, e-mail, fax, or other means), IVR system 414 via PSTN 420, etc. In step 908, the customer enters the registration code from the customer's pet collar. The customer also enters other personal information, as prompted by the tracking coordination facility (step 910). Some of this information may include, for example, the customer's name, a security password, home location of the pet (for use in locating the pet relative to this home), etc. Additionally, the tracking coordination facility 110 may also prompt the customer to identify the product reseller (if any) in step 912. This information may be useful, for example, to determine which distribution channels are working and which resellers may need additional product for restocking. In step 913, the tracking coordination facility prompts the customer to enter billing information. Under one plan, a customer pays a subscription rate on a monthly or other basis, which entitles the customer to future pet locating services should they ever be needed. Under a different plan, the customer registers for free (or a small fee), and then pays a more expensive surcharge for pet locating service on an as-needed basis. Step 913 completes customer activation 906. Step 906 may be repeated as often as necessary, namely, whenever a new customer purchases a pet collar, registers or re-registers, changes payment plans, etc.

Next, in step 914 the manager 406 of the tracking coordination facility 110 stores the customer's information in the database 404. In step 916, the tracking coordination facility stands ready to receive and process the customer's requests to locate his/her lost pet. Step 906 may be repeated as required for each newly subscribing customer.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for locating a mobile object, comprising operations of:
    attaching a remote tracking device to the mobile object, the remote tracking device comprising a one-way tone-only paging receiver having a unique capcode, wireless telephone transceiver having a nonconforming transmit-only mobile identification number (MIN), global positioning system (GPS) unit, and a controller;
    from a requesting source, a tracking coordination facility receiving a request to locate the mobile object;
    responsive to receiving the request, performing operations comprising:
        the tracking coordination facility identifying destination information exclusively associated with the mobile object;
        the tracking coordination facility utilizing the destination information to transmit an activation signal to the paging receiver of the remote tracking device attached to the requested mobile object;
    responsive to the paging receiver receiving the activation signal, the paging receiver issuing a tone-only output to the controller, and in response, the controller activating the GPS unit to determine position and thereafter activating the transceiver to transmit a representation of the determined position to the tracking coordination facility;
    the tracking coordination facility providing an output of the determined position to the requesting source.

2. The method of claim 1, the operation of receiving the request comprising receiving the request via at least one of the following: telephone, Internet web site, e-mail, facsimile, hand delivery.

3. The method of claim 1, where the operation of providing an output of the position comprises outputting a representation of the determined position via at least one of the following: telephone, Internet web site, e-mail, facsimile, hand delivery.

4. The method of claim 1,
    the tracking coordination facility receiving a deactivation request;
    responsive to receiving the deactivation request, transmitting a paging deactivation signal to the remote tracking device;
    responsive to receiving the paging deactivation signal, the remote tracking device removing electrical power from circuitry comprising at least the GPS unit and the transceiver.

5. The method of claim 1, further comprising:
    after transmitting the representation of the determined position, the remote tracking device automatically removing electrical power from circuitry including at least the GPS unit and the transceiver.

6. A method of operating a mobile object locating system, comprising operations of:
    making arrangements for wireless communications service for multiple wireless telephone transceivers such that each has a nonconforming, transmit-only mobile identification number (MIN);
    making arrangements for receive-only tone-only paging service for multiple paging receivers such that each has a unique capcode;
    distributing multiple remote tracking devices for use by customers, each remote tracking device including one of the paging receivers, one of the wireless telephone transceivers, a global positioning system (GPS) unit, and at least one controller;
    assigning each remote tracking device to a mobile object and configuring a database cross-referencing different destination information for each remote tracking device with a corresponding code identifying the mobile object assigned to that mobile tracking device;
    responsive to receiving each request from a requesting source to locate a specified mobile object, performing operations comprising:
        accessing the database to determine destination information for the remote tracking device assigned to the specified mobile object;
        using the determined destination information to transmit an activation signal to paging receiver of the remote tracking device assigned to the specified mobile object.

7. The method of claim 6,
    further comprising operations including, from a requesting source, receiving a request to locate a specified mobile object;
    the request being received by one or more of the following: interaction with Internet web site, discussion with a live operator via telephone, interaction with a telephonic interactive voice response system, transmission by mail, transmission by facsimile, transmission by e-mail.

8. The method of claim 6, the operations further comprising:
    receiving a location report from the remote tracking device;
    issuing an output representative of the location report, the report being issued to the requesting source via one or more of the following: interaction with Internet web site, discussion with a live operator via telephone, interaction with a telephonic interactive voice response system, transmission by mail, transmission by facsimile, transmission by e-mail.

9. The method of claim 6, comprising further operations of:

before selling a mobile tracking device, applying a registration code to one or more of the following: product literature for the mobile tracking device, product packaging of the mobile tracking device, the mobile tracking device itself;

providing registration services to accept customer information including the registration code by communicating with purchasers of mobile tracking devices via one or more of the following: Internet web server, telephone voice conversation, use of telephonic interactive voice response system, facsimile, manual delivery.

10. The method of claim 9, said registration services additionally including entering subscription contracts with customers for future on-demand pet locating services.

11. The method of claim 6, further comprising entering subscription contracts with customers for future on-demand pet locating services.

12. The method of claim 6, further comprising charging customers on a subscription basis for pet location services.

13. A remote tracking and reporting apparatus, comprising:

a one-way tone-only paging receiver having a unique capcode;

a wireless telephone transceiver having a nonconforming transmit-only mobile identification number (MIN);

a position locating device;

at least one controller coupled to the receiver, transceiver and position locating device, configured to perform operations comprising:

responsive to the paging receiver receiving an activation signal, activating the position locating device to take a position reading;

activating the transceiver to transmit a representation of the position reading to a predetermined remote site.

14. The apparatus of claim 13, the position locating device comprising one of the following: a GPS unit, a long range navigation (LORAN) unit, an inertial navigation unit, wireless network-based location unit.

15. A remote tracking and reporting apparatus, comprising:

a case defining a compartment therein;

positioned inside the compartment, components comprising:

a one-way tone-only paging receiver having a unique capcode and being coupled to a first antenna;

a wireless telephone transceiver having a nonconforming transmit-only mobile identification number (MIN) and being coupled to a second antenna;

a global positioning system (GPS) unit coupled to a third antenna;

at least one controller configured to perform operations comprising:

responsive to the paging receiver receiving an activation signal, activating the GPS unit to take a position reading;

activating the transceiver to transmit a representation of the position reading to a predetermined remote site.

16. The apparatus of claim 15, where the case comprises a pet collar.

17. A remote tracking and reporting apparatus, comprising:

pager means for receiving activation signals targeted at a unique capcode and issuing at least one tone only pager output;

wireless telephone transceiver means for transmitting and receiving wireless data, said transceiver means having a nonconforming transmit-only mobile identification number (MIN);

locating means for ascertaining position;

controller means for managing the pager means, transceiver means, and locating means by:

responsive to the pager means receiving an activation signal, activating the locating means to take a position reading;

activating the transceiver means to transmit a representation of the position reading to a predetermined remote site.

18. A tracking coordination facility for use in locating remote tracking devices each including a one-way tone-only paging receiver, wireless telephone transceiver, self-locating apparatus, and circuitry responsive to receipt of a activation signal by the paging receiver to transmit a location report via the transceiver, the tracking coordination facility comprising:

a database cross-referencing different destination information for each of multiple remote tracking devices with a corresponding code identifying the mobile object assigned to that mobile tracking device;

a customer Interface utility including one or more of the following: Internet web server, telephone voice line, telephonic interactive voice response system, facsimile machine, operator interface;

a tracking coordination facility manager programmed to perform operations comprising:

receiving requests from a requesting source via the customer interface utility to locate a specified mobile object;

responsive to each request, performing operations comprising accessing the database to determine destination information for the remote tracking device assigned to the specified mobile object, and utilizing the destination information to issue an activation signal to the paging receiver of the remote tracking device assigned to the specified mobile object.

19. An automated tracking coordination facility:

a database cross-referencing different destination information for each of multiple remote tracking devices with a corresponding code identifying the mobile object assigned to that mobile tracking device;

a customer interface utility;

a digital data processing machine coupled to the database and the customer interface utility, and programmed to perform operations comprising:

receiving requests from a requesting source via the customer interface utility to locate a specified mobile object;

responsive to each request, automatically performing operations comprising:

accessing the database to determine destination information for the remote tracking device assigned to the specified mobile object;

utilizing the destination information to issue an activation signal to the paging receiver of the remote tracking device assigned to the specified mobile object;

receiving a location report from the assigned remote tracking device;

via the customer interface utility, issuing an output representative of the location report.

* * * * *